US012593355B2

(12) United States Patent
Lin et al.

(10) Patent No.: US 12,593,355 B2
(45) Date of Patent: Mar. 31, 2026

(54) SWITCHING BETWEEN CHANNEL ACCESS PROCEDURES THAT INCLUDE AND EXCLUDE RECEIVING BEFORE TRANSMITTING

(71) Applicant: ZTE Corporation, Shenzhen (CN)

(72) Inventors: Wei Lin, Shenzhen (CN); Li Tian, Shenzhen (CN); Ling Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 381 days.

(21) Appl. No.: 18/352,016

(22) Filed: Jul. 13, 2023

(65) Prior Publication Data

US 2023/0362985 A1     Nov. 9, 2023

Related U.S. Application Data

(63) Continuation of application No. PCT/CN2021/086555, filed on Apr. 12, 2021.

(51) Int. Cl.
*H04W 74/02*          (2009.01)
*H04W 74/00*          (2009.01)
*H04W 74/0808*       (2024.01)

(52) U.S. Cl.
CPC ......... *H04W 74/02* (2013.01); *H04W 74/002* (2013.01); *H04W 74/0808* (2013.01)

(58) Field of Classification Search
CPC ............... H04W 74/02; H04W 74/002; H04W 74/0808; H04W 74/0816; H04W 74/0866; H04W 74/0833; H04W 74/0841; Y02D 30/70
USPC ........................................................ 370/329
See application file for complete search history.

(56) References Cited

U.S. PATENT DOCUMENTS 10,673,576 B2 *   6/2020   Um ....................... H04L 1/1816
2018/0343676 A1 *  11/2018   Yerramalli ........ H04W 74/0808
(Continued)

FOREIGN PATENT DOCUMENTS

CN          105611540 A     5/2016
CN          110138530 A     8/2019
(Continued)

OTHER PUBLICATIONS

LG Electronics, "Channel access procedure for NR unlicensed operation," 3GPP TSG RAN WG1 Meeting #94bis R1-1810269, Chengdu, China, Oct. 8-12, 2018 (8 pages).
(Continued)

*Primary Examiner* — Ricardo H Castaneyra
(74) *Attorney, Agent, or Firm* — Perkins Coie LLP

(57)          ABSTRACT

This patent document describes, among other things techniques for determining when to switch between a channel access procedure that includes a listen before talk (LBT) process and a channel access procedure that does not include a LBT process. In one aspect, a method of wireless communication is disclosed. The method includes receiving, by a first network node from a second network node, a message specifying a first channel access procedure to be used by the first network node after being powered up. The method further includes selecting, by the first network node, a second channel access procedure to be used after the first channel access procedure after satisfying a condition, wherein if the condition is not satisfied the first network node continues to use the first channel access procedure.

15 Claims, 6 Drawing Sheets

100

(56) References Cited

U.S. PATENT DOCUMENTS

| | | | | |
|---|---|---|---|---|
| 2020/0187250 A1* | 6/2020 | Bhattad | ................. | H04W 16/14 |
| 2021/0298080 A1 | 9/2021 | Wu | | |
| 2022/0217771 A1* | 7/2022 | Liu | .......................... | H04L 5/16 |

FOREIGN PATENT DOCUMENTS

| | | | |
|---|---|---|---|
| CN | 110167147 A | 8/2019 |
| WO | 2020023230 A1 | 1/2020 |
| WO | 2021/016973 A1 | 2/2021 |

OTHER PUBLICATIONS

International Search Report and Written Opinion for International Patent Application No. PCT/CN2021/086555, mailed Jan. 13, 2022 (7 pages).

Extended European Search Report for European Patent Application No. 21936315.7, mailed Dec. 5, 2023 (11 pages).

Apple Inc., "Views on Channel Access Mechanisms for Unlicensed Access above 52.6 Ghz," 3GPP TSG RAN WG1 #103-e, R1-2008458, e-Meeting, Oct. 26-Nov. 13, 2020 (9 pages).

Qualcomm Inc. (Moderator), "FL summary for channel access mechanism for 52.6GHZ-71GHz band," 3GPP TSG RAN WG1 Meeting #103-e, R1-2009368, Oct. 26-Nov. 13, 2020 (58 pages).

Nokia et al., "Channel access mechanism," 3GPP TSG RAN WG1 #104-e, R1-2100262, e-Meeting, Jan. 25-Feb. 5, 2021 (14 pages).

* cited by examiner

100
LBT
without LBT
LBT
Duration-1
110
Duration-2
120
Duration-3
130
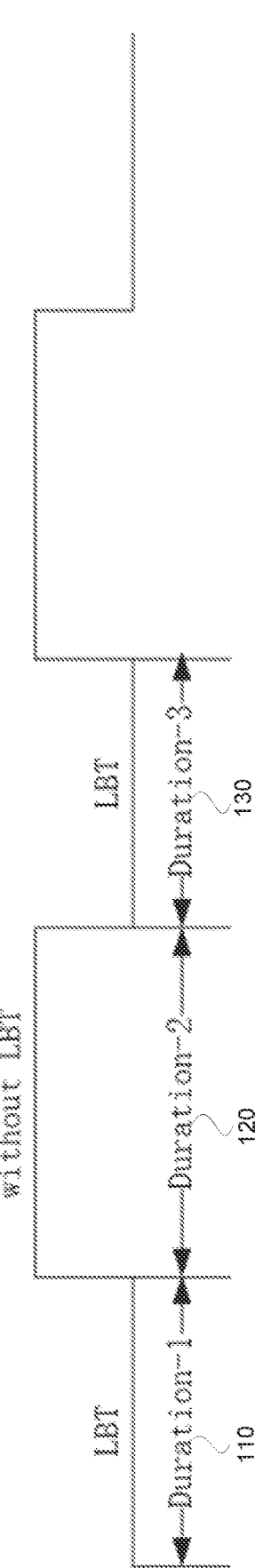
FIG. 1

200
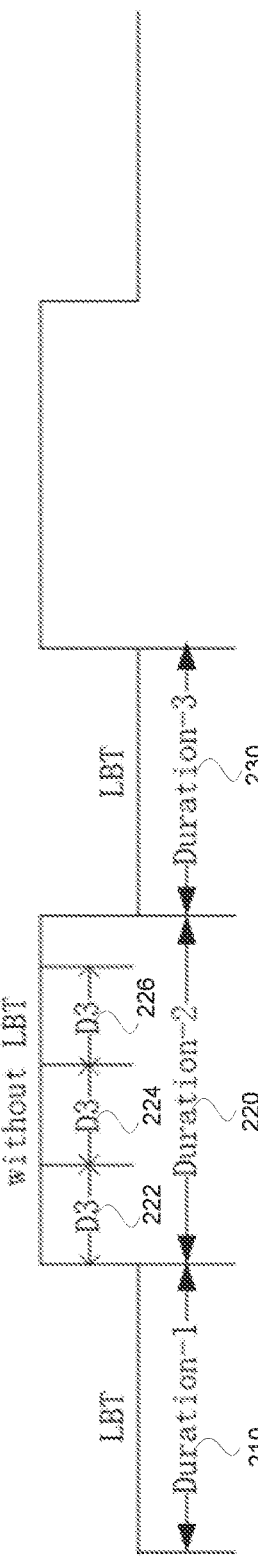
LBT
without LBT
LBT
D3
222
D3
224
D3
226
Duration-1
210
Duration-2
220
Duration-3
230
FIG. 2

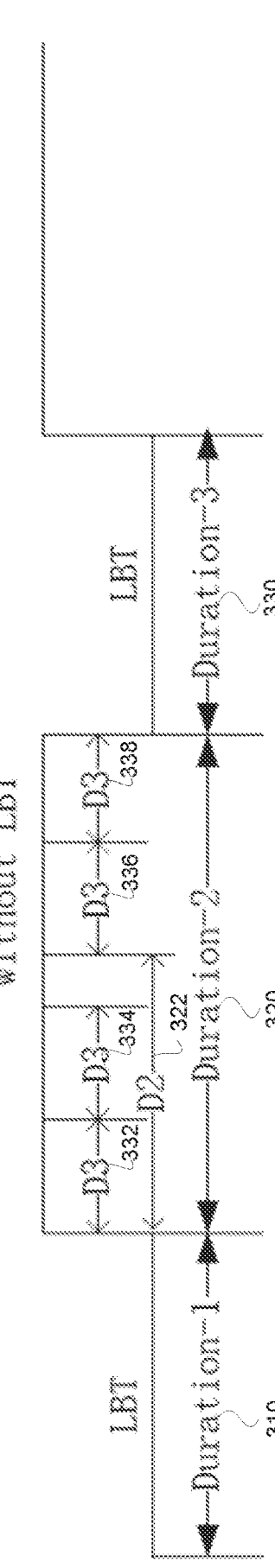
FIG. 3

Figure 4:
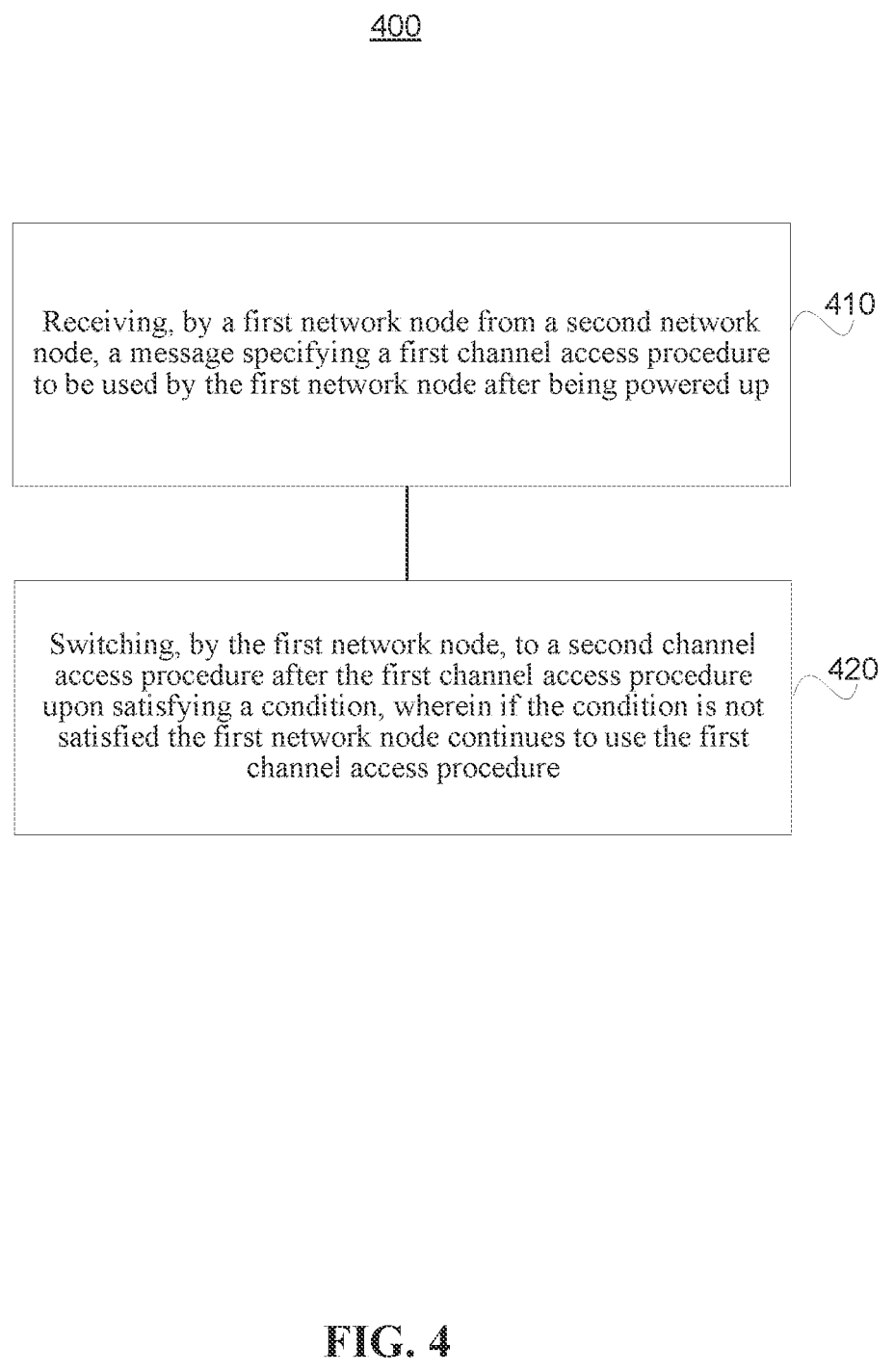

400

Receiving, by a first network node from a second network node, a message specifying a first channel access procedure to be used by the first network node after being powered up ⟋410

Switching, by the first network node, to a second channel access procedure after the first channel access procedure upon satisfying a condition, wherein if the condition is not satisfied the first network node continues to use the first channel access procedure ⟋420

SWITCHING BETWEEN CHANNEL ACCESS PROCEDURES THAT INCLUDE AND EXCLUDE RECEIVING BEFORE TRANSMITTING

CROSS REFERENCE TO RELATED APPLICATIONS

This patent document is a continuation of and claims benefit of priority to International Patent Application No. PCT/CN2021/086555, filed on Apr. 12, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity using public as well as non-public networks. Other aspects, such as energy consumption, device cost, spectral efficiency, and latency are also important to meeting the needs of various communication scenarios. Various techniques, including new ways to improve data transmission efficiency by reducing communications overhead, provide higher quality of service, longer battery life, and improved performance are being discussed.

SUMMARY

This patent document describes, among other things techniques for determining when to switch between a channel access procedure that includes a listen before talk (LBT) process and a channel access procedure that does not include a LBT process.

In one aspect, a method of wireless communication is disclosed. The method includes receiving, by a first network node from a second network node, a message specifying a first channel access procedure to be used by the first network node after being powered up. The method further includes switching, by the first network node, to a second channel access procedure after the first channel access procedure upon satisfying a condition, wherein if the condition is not satisfied the first network node continues to use the first channel access procedure.

BRIEF DESCRIPTION OF DRAWINGS

FIG. 1 shows an example of a channel access procedure.

FIG. 2 shows another example of a channel access procedure.

FIG. 3 shows yet another example of a channel access procedure.

FIG. 4 shows an example of a process.

DETAILED DESCRIPTION

Figure 5:
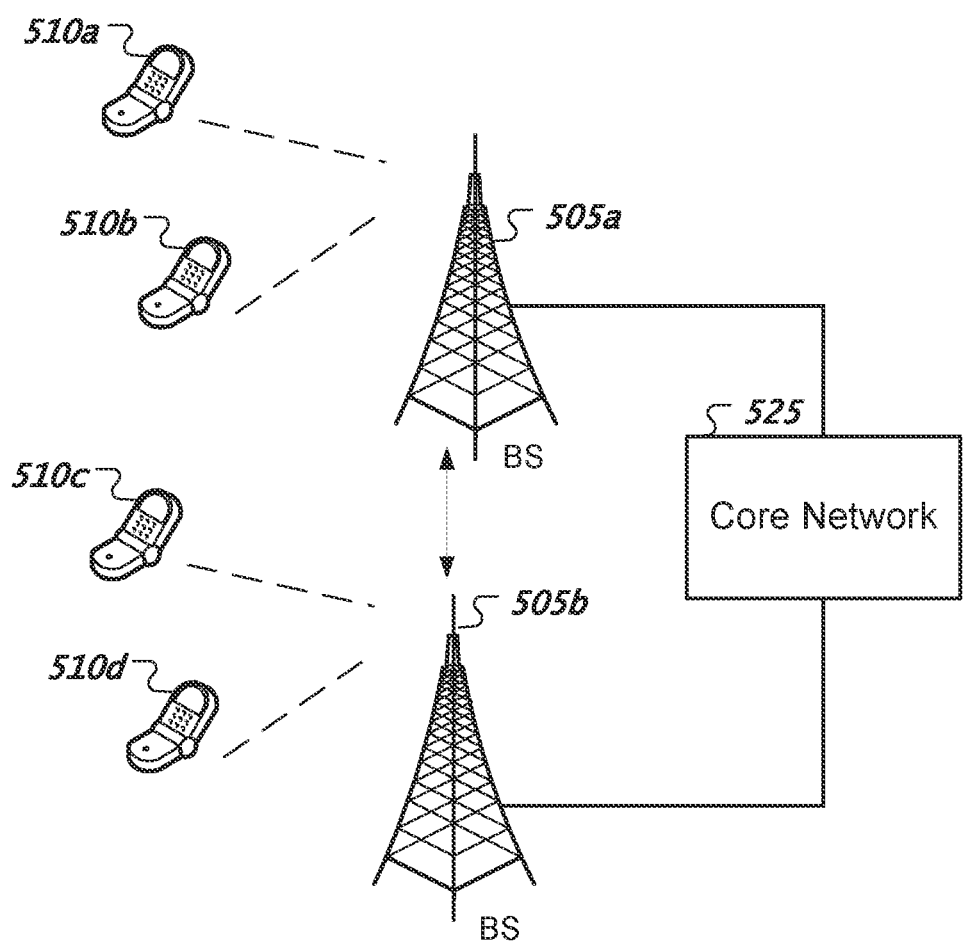
FIG. 5 shows an example of a wireless communication system in which one or more embodiments of the present technology can be applied.

Disclosed are techniques and devices for determining when to use a "listen before talk" (LBT) channel access procedure. When the data throughput through the channel is relatively high the probability of a busy channel increases and devices should perform LBT in order to assess whether the channel is idle or not. An idle channel can be used to transmit data.

Certain features are described using the example of the Fifth Generation (5G) wireless protocol for illustrative purposes. However, applicability of the disclosed techniques is not limited to 5G wireless systems and can be applied to other wireless systems.

Headings are used below for clarity of presentation and are not intended to limit the applicability of the subject matter across the various disclosed embodiments.

In low data traffic conditions, channel access procedures that exclude a listen before talk (LBT) process can be more effective than channel access procedures that include LBT. However, in high data traffic conditions, channel access procedures that include LBT maybe more effective than channel access procedures that exclude LBT. Disclosed are methods and conditions for determining when to switch between channel access procedures that include LBT and channel access procedures that exclude LBT.

In some communications systems, the high-frequency bands such as bands at frequencies over 30-50 GHz tend to not have use contentions in which case LBT may not be needed. In the lower frequency bands, there tend to be more contentions for use for those bands leading to LBT being needed.

In shared spectrum in the low frequency range, equipment may have to perform a channel access procedure to assess whether the channel is clear or not before using the shared spectrum to send an uplink or downlink (UL/DL) transmission. LBT (also referred to as clear channel assessment (CCA)) is a procedure for the assessment of whether or not the channel is clear for use.

Communications system simulations have indicated that in the frequency range above about 30-50 (e.g., 52.6 GHz), LBT does not need to be used before every UL/DL transmission. For example, except for high traffic load conditions, the probability of channel idleness is relatively high for sufficient system bandwidth resources and the use of multiple-input multiple-output (MIMO) antenna technology. Except for high traffic load conditions, a channel access procedure that includes LBT may not bring system data throughput efficiency gains. In this case, due to the communications overhead needed to implement LBT, there will be some waste of resources and an increase in delay. In high traffic load conditions, collisions resulting in interference can be controlled or mitigated with the use of LBT. Accordingly, a method is needed to switch between a channel access procedure that includes LBT and a channel access procedure that does not include LBT.

Example 1

After a device power on or random-access channel success, the device performs a channel access procedure. The device can be a base station (BS), a user equipment (UE), a mobile station, or any other wireless device or network side device. By default, the procedure is performed immediately before the first transmission opportunity and can be configured by radio resource control (RRC), by system information block (SIB), or indicated by downlink control information (DCI), or another path. The channel access procedure may or may not include LBT.

Method 1.

In some example embodiments, a channel access procedure with LBT shall switch to a channel access procedure without LBT when the contention window (CW) value is set to a value, CW1, or less than CW1 after a CW adjustment procedure. The CW1 value may be a minimum CW value in a set of allowed CW values.

Method 1.1.

In some example embodiments, the channel access procedure shall maintain LBT if a CW value is reset to CW1 or a value less than CW1 when a maximum CW value in the allowed CW value set is consecutively used K times for initialization of channel access procedure parameters. K is a preset value or is selected by the device from a set of integer values.

Method 2.

In some example embodiments, the channel access procedure with LBT shall switch to a channel access procedure without LBT when the device uses the channel for transmission with LBT for a channel occupancy time (COT) of duration D1. The duration D1 may be a default value, a semi-static value configured by an RRC message, a dynamic value indicated by a DCI, or determined from another message.

Method 3.

In some example embodiments, the channel access procedure without LBT shall switch to a channel access procedure with LBT when the device uses the channel for transmission without LBT for a channel occupancy time (COT) of duration D2. The duration D2 may be a default value, a semi-static value configured by an RRC message, a dynamic value indicated by DCI, or determined from another message.

In the example of FIG. 1, a CW value is set as CW1 or less than CW1 according to a CW adjustment procedure at the end of duration-1 (130) and the channel access procedure with LBT switches to a channel access procedure without LBT. The device switches from the channel access procedure without LBT to the channel access procedure with LBT after duration D2 which is equal to duration-2 (120) as show in FIG. 1. After duration-2 (120), the device performs a channel access procedure with LBT in duration-3 (130) used for transmission and the CW value is set to CW1 or less than CW1 according to CW adjustment procedure at the end of duration-3 and the channel access with LBT switches to channel access without LBT.

Method 3.1.

In some example embodiments, according to a CW adjustment procedure, in the duration D2 the CW value continues to be maintained at CW1 or less than CW1 and the device continues to maintain the channel access procedure without LBT for a duration D2.

Method 4.

In some example embodiments, the device switches from the channel access procedure without LBT to the channel access procedure with LBT until the CW value increases to CW2 or more than CW2 based on the CW adjustment procedure. The CW2 may be a maximum CW value from the allowed CW value set, a minimum CW value from the allowed CW value set, or another value.

Method 4.1.

The CW adjustment procedure based on the duration D2.

In the example of FIG. 1, CW value is set as CW1 or less than CW1 according to CW adjustment procedure in the end of Duration-1 (110) and channel access procedure with LBT switches to channel access procedure without LBT. In the duration-2 (120), the device switches the channel access procedure without LBT to the channel access procedure with LBT until CW value increases to CW2 or more than CW2 based on the CW adjustment procedure. That is, duration-2 (120) may contain multiple D2 and CW value increases to CW2 according to the CW adjustment procedure in the last duration D2 of Duration-2. Then, the device performs channel access procedure with LBT in duration-3 (130) used for transmission and CW value is set as CW1 or less than CW1 according to CW adjustment procedure in the end of duration-3 (130) and channel access procedure with LBT switches to channel access procedure without LBT.

Method 4.2.

In some example embodiments, channel access procedure without LBT shall switch to channel access procedure with LBT when the CW value increases to CW2 or more than CW2 according to the CW adjustment procedure in the duration D3, or after channel access procedure without LBT for duration D2, whichever is reached first. The duration D3 is a duration in the duration D2 used to CW adjustment procedure where duration D3 may be a default value, a semi-static value configured by radio resource control (RRC), a dynamic value indicated by downlink control information, or determined from another message.

For example, in FIG. 2, CW value is set as CW1 or less than CW1 according to CW adjustment procedure in the end of Duration-1 and channel access procedure with LBT switches to channel access procedure without LBT. In the Duration-2, the device switches the channel access procedure without LBT to the channel access procedure with LBT until CW value increases to CW2 according to the CW adjustment procedure in one of the durations D3 (222, 224, 226) or after channel access procedure without LBT for duration D2.

Method 4.3.

In some example embodiments, the device continues to maintain the channel access procedure without LBT for a duration D2 if the CW value is successively CW1 or successively less than CW1 according to the CW adjustment procedure in the last duration D2. For example, duration D2 can include more than N (N is an integer) D3 durations and the CW value is CW1 or less than CW1 for all N D3 durations in the duration D2. The device shall switch from the channel access procedure without LBT to the channel access procedure with LBT when the CW value increases to CW2 or more than CW2 according to the CW adjustment procedure in duration D3 (240) for the first time.

In the example of FIG. 3, a CW value is set to CW1 or less than CW1 according to CW adjustment procedure in the end of duration-1 (310) and channel access procedure with LBT is switched to the channel access procedure without LBT. The channel access procedure without LBT continues to maintain for a second duration D2 (322) when the CW value is always CW1 or always less than CW1 according to the CW adjustment procedure based on all the duration D3 (332, 334) in the first duration D2 (322) in FIG. 3. When the CW value increases to CW2 according to the CW adjustment procedure based on the second duration D3 (336, 338) of the second duration D2 (not labelled in FIG. 3), the channel access procedure without LBT switches to the channel access procedure with LBT.

Method 5.

In some example embodiments, the channel access procedure without LBT shall switch to the channel access procedure with LBT when the CW value is set to CW2 or more than CW2 according to the CW adjustment procedure based on the reference duration D4 and the reference duration D4 can be configured by RRC, indicated by DCI, or determined from another message.

Example 2

A device can be configured via a parameter fixed frame period (FFP) in a frame based equipment (FBE) mode (also referred to as a semi-static channel access period). The device can be a base station (BS), a user equipment (UE), mobile station, or any other wireless device or network node. The FFP of the BS and UE can be updated by radio resource control (RRC) where the updated FFP parameters have an effective time.

Method 1.

In some example embodiments, the updated FFP of the device can be applied starting from the even indexed radio frame, which is the closest even indexed radio frame which satisfies the minimum time interval T1 between the end of the updated FFP and the start of the even indexed radio frame. T1 may be a default value, configured by RRC, indicated by DCI, or determined by another message.

Method 2.

In some example embodiments, the updated FFP of the BS can be applied starting from the even indexed radio frame and/or the updated FFP of the UE can be applied starting with an offset after the even indexed radio frame. The even indexed radio frame is the closest even indexed radio frame which satisfies the minimum time interval T1 between the end of the updated FFP of BS and the start of the even indexed radio frame.

FIG. 4 shows an example of a method 400 for wireless communication. At 410, in some embodiments of the disclosed technology, the method includes receiving, by a first network node from a second network node, a message specifying a first channel access procedure to be used by the first network node after being powered up. At 420, the method includes switching, by the first network node, to a second channel access procedure after the first channel access procedure upon satisfying a condition, wherein if the condition is not satisfied the first network node continues to use the first channel access procedure.

FIG. 5 shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors. The base station 505a, 505b may communicate directly with one another wirelessly or via a wired interface including a direct wired interface, a wired network, or the Internet. Various network nodes of the disclosed subject matter can be implemented at the base station and/or wireless device, and various other network nodes.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies. The techniques and embodiments described in the present document may be implemented by the base stations described in the present document or by wireless devices.

Figure 6:
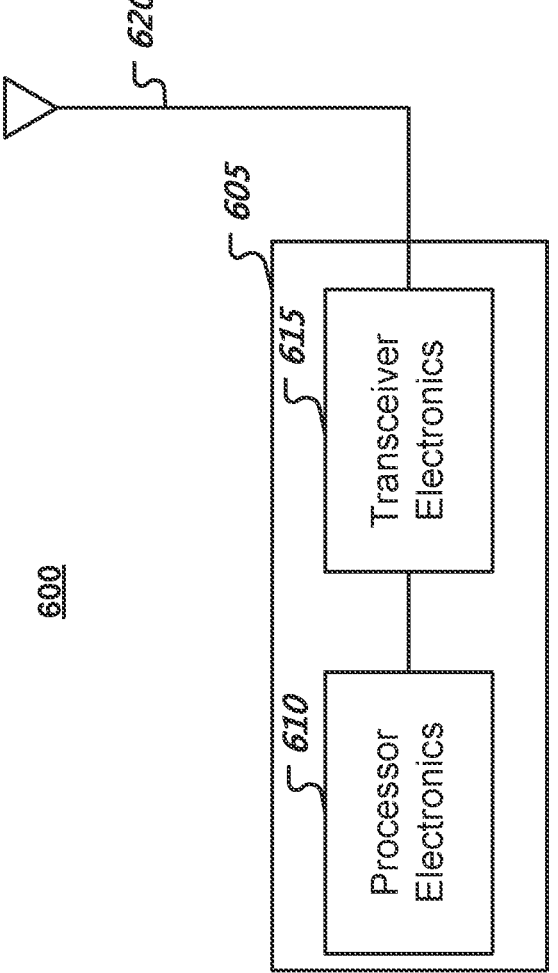
FIG. 6 shows an example of a block diagram representation of a portion of a radio station in which one or more embodiments of the present technology can be applied.

FIG. 6 is a block diagram representation of a portion of a radio station in accordance with one or more embodiments of the present technology can be applied. A radio 605 such as a base station/core network or a wireless device (or UE) can include electronics 610 such as a microprocessor that implements one or more of the wireless techniques presented in this document. The radio 605 can include transceiver electronics 615 to send and/or receive wireless signals over one or more communication interfaces such as antenna 620. The radio 605 can include other communication interfaces for transmitting and receiving data. Radio 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio 605. In some embodiments, the radio 605 may be configured to perform the methods described in this document, including implementation of a network node as described herein.

SUMMARY

In Example 1, the channel access procedure is switched between an LBT procedure and a channel access procedure without LBT. Methods 1 and 2 are used to switch from the channel access procedure with LBT to the channel access procedure without LBT. Method 1 switches the channel access procedure according to the result of a CW adjustment procedure. Method 2 switches after the channel access procedure with LBT has been used for a duration D1. Methods 3-5 are used to switch from the channel access procedure without LBT to the channel access procedure with LBT. Method 3 switches after the channel access procedure without LBT has been used for a duration D2. In method 3.1, according to the result of CW adjustment procedure in the last D2, the device may maintain the channel access procedure without LBT for multiple D2. Method 4 switches the channel access procedure according to the result of CW adjustment procedure. In method 4.1, the CW adjustment procedure is based on the duration D2 and Duration-2 which may include more than one D2. In method 4.2, the CW adjustment procedure is based on the duration D3 and D2 include more than one D3 and duration-2 may be equal to D2 or less than D2. In method 4.3, duration-2 may be less than D2 or not include integer multiple D2; duration-2 may be more than more than one D2. Method 5 switches the channel access procedure according to the result of CW adjustment procedure based on D4 and D4 may have no matter with D2.

Some embodiments may preferably implement one or more of the following solutions, listed in clause-format. The following clauses are supported and further described above and throughout this document. As used in the clauses below and in the claims, a network node can be a wireless device, user equipment, mobile station, or any other wireless terminal, or can be a base station including a next generation Node B (gNB), enhanced Node B (eNB), or any other device that performs as a base station.

The technical solutions described by the following clauses may be preferably implemented by some embodiments.

Clause 1. A method, comprising: receiving, by a first network node from a second network node, a message specifying a first channel access procedure to be used by the first network node after being powered up; and switching, by the first network node, to a second channel access procedure after the first channel access procedure upon satisfying a condition, wherein if the condition is not satisfied the first network node continues to use the first channel access procedure.

Clause 2. The method of clause 1, wherein the first network node is a wireless device and the second network node is a base station node.

Clause 3. The method of clause 1, wherein the first network node is a base station node and the second network node is another network side node.

Clause 4. The method of clause 1, wherein the first channel access procedure includes a listen before talk (LBT) process and the second channel access procedure excludes the LBT process.

Clause 5. The method of clause 1, wherein the first channel access procedure excludes an LBT process and the second channel access procedure includes the LBT process.

Clause 6. The method of clause 4, wherein the condition is satisfied if a contention window (CW) is set to a first predetermined value or less after a contention window adjustment procedure is performed, wherein the first predetermined value is a minimum value in a set of allowed CW values.

Clause 7. The method of clause 4, wherein the condition is not satisfied if a CW is set to a predetermined maximum value consecutively for K initializations of the channel access procedure, wherein K is an integer value.

Clause 8. The method of clause 4, wherein the condition is satisfied if the first network node uses the first channel access procedure for a predetermined channel occupancy time (COT) D1, wherein the COT D1 is a default value, a value configured by a radio resource control (RRC) message, or a value indicated by a downlink control information (DCI).

Clause 9. The method of clause 5, wherein the condition is satisfied if the first network node uses the first channel access procedure for a predetermined channel occupancy time (COT) D2, wherein the COT D2 is a default value, a value configured by an RRC message, or a value indicated by a DCI.

Clause 10. The method of clause 5, wherein a contention window adjustment procedure is performed during a duration D2, wherein the condition is not satisfied if a contention window (CW) is set to a first predetermined value or less.

Clause 11. The method of clause 5, wherein the condition is satisfied after a contention window adjustment procedure is performed if a contention window (CW) value is set to a value greater than CW2 and CW2 is a minimum value in a set of allowed CW values, or the CW value is set to another value greater than or equal to CW2 and CW2 is a maximum value in the set of allowed CW values or another value in the set of allowed CW values between the minimum value and the maximum value.

Clause 12. The method of clause 11, wherein multiple contention window adjustment procedures are performed, and wherein the condition is satisfied at a first of the multiple contention window adjustment procedures where the contention window (CW) is increased to the predetermined value CW2, or a greater value, according to the first of the multiple contention window adjustment procedure in a duration D3, or after a channel access procedure without LBT for duration D2, whichever occurs first.

Clause 13. The method of clause 5, wherein the condition is not satisfied if the CW value is a minimum value CW1 or less according to the contention window adjustment procedure for a duration D2 or D3 and is satisfied if the CW value increases to CW2 or more according to the CW adjustment procedure for a duration D3 for a first time.

Clause 14. The method of clause 5, wherein the condition is satisfied if the contention window is set to a predetermined value CW2 or greater after a contention window adjustment procedure based on a reference duration D4 configured by an RRC message or DCI.

Clause 15. The method of clause 1, wherein the method is performed by a data communications radio operating at a frequency above 50 GHz.

Clause 16. The method of clause 3, wherein the second network node is internal to the base station.

Clause 17. An apparatus, comprising a processor configured to implement a method recited in any one or more of clauses 1 to 16.

Clause 18. A computer program product having code stored thereon, the code, when executed by a processor, causing the processor to implement a method recited in any one or more of clauses 1 to 16.

In some example embodiments, the second network node performs a method in which it transmits to the first network node a message specifying a first channel access procedure to be used by the first network node after being powered up causing the first network node to switch to a second channel access procedure after the first channel access procedure upon satisfying a condition, wherein if the condition is not satisfied the first network node continues to use the first channel access procedure.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

What is claimed is:

1. A method, comprising:

receiving, by a first network node from a second network node, a message specifying a first channel access procedure to be used by the first network node after being powered up; and switching, by the first network node, to a second channel access procedure after the first channel access procedure upon satisfying a condition, wherein in response to the condition not being satisfied, the first network node continues to use the first channel access procedure;

wherein the first channel access procedure excludes an LBT process and the second channel access procedure includes the LBT process;

wherein the condition is satisfied after a contention window adjustment procedure is performed in response to a contention window (CW) value being set to a value greater than CW2 and CW2 is a minimum value in a set of allowed CW values, or the CW value being set to another value greater than or equal to CW2 and CW2 is a maximum value in the set of allowed CW values or another value in the set of allowed CW values between the minimum value and the maximum value; or wherein the condition is not satisfied in response to a contention window (CW) value being a minimum value CW1 or less according to a contention window adjustment procedure for a duration D2 or D3 and is satisfied in response to the CW value increasing to CW2 or more according to the CW adjustment procedure for a duration D3 for a first time.

2. The method of claim 1, wherein the first network node is a wireless device and the second network node is a base station node.

3. The method of claim 1, wherein the first network node is a base station node and the second network node is another network side node.

4. The method of claim 1, wherein the first channel access procedure includes a listen before talk (LBT) process and the second channel access procedure excludes the LBT process.

5. The method of claim 4, wherein the condition is satisfied in response to the first network node using the first channel access procedure for a predetermined channel occupancy time (COT) D1, wherein the COT D1 is a default value, a value configured by a radio resource control (RRC) message, or a value indicated by a downlink control information (DCI).

6. The method of claim 1, wherein the condition is satisfied in response to the first network node using the first channel access procedure for a predetermined channel occupancy time (COT) D2, wherein the COT D2 is a default value, a value configured by an RRC message, or a value indicated by a DCI.

7. The method of claim 1, wherein a contention window adjustment procedure is performed during a duration D2, wherein the condition is not satisfied in response to a contention window (CW) being set to a first predetermined value or less.

8. The method of claim 1, wherein multiple contention window adjustment procedures are performed, and wherein the condition is satisfied at a first of the multiple contention window adjustment procedures where the contention window (CW) is increased to a predetermined value CW2, or a greater value, according to the first of the multiple contention window adjustment procedure in a duration D3, or after a channel access procedure without LBT for duration D2, whichever occurs first.

9. The method of claim 1, wherein the condition is satisfied in response to a contention window being set to a predetermined value CW2 or greater after a contention window adjustment procedure based on a reference duration D4 configured by an RRC message or DCI.

10. An apparatus, comprising:

a processor configured to implement a method, the processor configured to:

receive, by a first network node from a second network node, a message specifying a first channel access procedure to be used by the first network node after being powered up; and switch, by the first network node, to a second channel access procedure after the first channel access procedure upon satisfying a condition, wherein in response to the condition being not satisfied, the first network node continues to use the first channel access procedure;

wherein the first channel access procedure excludes an LBT process and the second channel access procedure includes the LBT process;

wherein the condition is satisfied after a contention window adjustment procedure is performed in response to a contention window (CW) value being set to a value greater than CW2 and CW2 is a minimum value in a set of allowed CW values, or the CW value being set to another value greater than or equal to CW2 and CW2 is a maximum value in the set of allowed CW values or another value in the set of allowed CW values between the minimum value and the maximum value; or wherein the condition is not satisfied in response to a contention window (CW) value being a minimum value CW1 or less according to a contention window adjustment procedure for a duration D2 or D3 and is satisfied in response to the CW value increasing to CW2 or more according to the CW adjustment procedure for a duration D3 for a first time.

11. The apparatus of claim 10, wherein the first network node is a wireless device and the second network node is a base station node.

12

12. The apparatus of claim 10, wherein the first network node is a base station node and the second network node is another network side node.

13. The apparatus of claim 10, wherein the first channel access procedure includes a listen before talk (LBT) process and the second channel access procedure excludes the LBT process.

14. The apparatus of claim 10, wherein the condition is satisfied in response to the first network node using the first channel access procedure for a predetermined channel occupancy time (COT) D2, wherein the COT D2 is a default value, a value configured by an RRC message, or a value indicated by a DCI.

15. The apparatus of claim 10, wherein a contention window adjustment procedure is performed during a duration D2, wherein the condition is not satisfied in response to a contention window (CW) being set to a first predetermined value or less.

* * * * *